Nov. 15, 1938.　　　　J. C. WOODSON　　　　2,137,040
ENAMELING FURNACE
Filed Aug. 11, 1937　　　2 Sheets-Sheet 2

INVENTOR
James C. Woodson

Patented Nov. 15, 1938

2,137,040

UNITED STATES PATENT OFFICE 2,137,040

ENAMELING FURNACE

James C. Woodson, Cleveland, Ohio, assignor to Lee Wilson Sales Corporation, Cleveland, Ohio, a corporation of Ohio Application August 11, 1937, Serial No. 158,492

6 Claims. (Cl. 263—42)

This invention relates to a furnace, and in particular, to an enameling furnace, although it has other applications.

While improvements have been made in enameling furnaces in recent years, even the most modern furnaces now in use are characterized by certain objectionable features such as loss of heat through openings in the furnace wall, the discharge of combustion gases in the vicinity of the working space adjacent the furnace, and the like. It is an object of this invention to provide a furnace particularly adapted for enameling, which avoids the aforementioned objectionable features of such furnaces as now constructed.

In accordance with my invention, I provide a furnace with heat-exchange tubes extending across the floor or hearth thereof and upwardly along the side walls. The portions of the tubes extending along the side walls are of hair-pin shape in outline and the free ends thereof discharge into ducts extending along each side of the hearth and communicating with a stack.

For a complete understanding of the invention, reference will be made during the course of the following detailed description, to the accompanying drawings illustrating a present preferred embodiment, although it will be understood that modifications thereof may be made within the scope of my broader claims. In the drawings:

Figure 1:
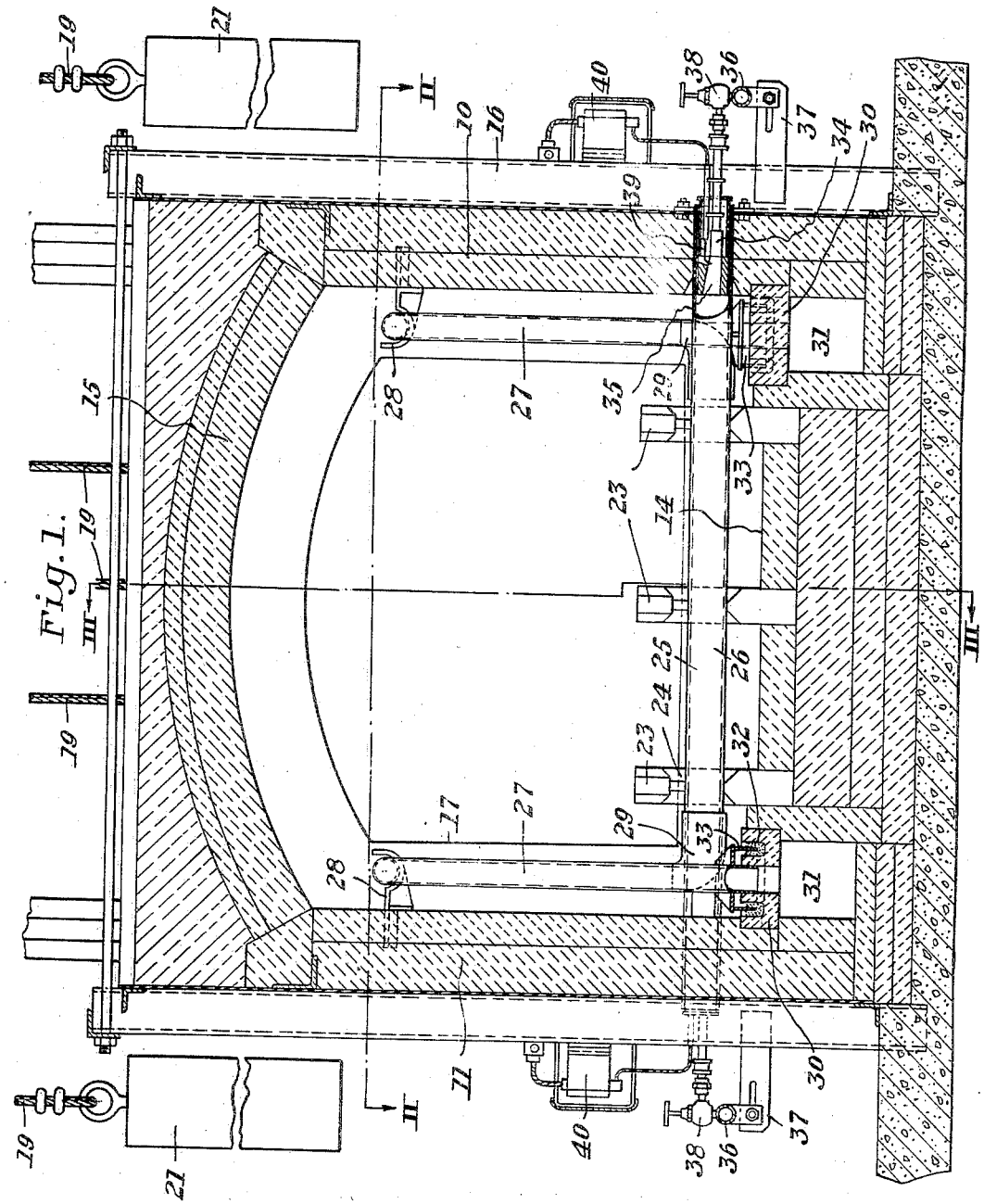
Figure 1 is a transverse vertical section through a furnace according to the invention.

Referring now in detail to the drawings, the furnace of my invention includes refractory side walls 10 and 11, end walls 12 and 13, a hearth 14 and a roof 15. The walls, hearth and roof of a furnace are assembled within a structural framework indicated generally by the numeral 16, in the usual manner. The end wall 12 is provided with a charging opening 17 adapted to be closed by a vertically sliding door 18. The door is suspended on cables 19, extending over suitably supported sheaves 20 to counterweights 21. Fixed guide rolls 22 force the door tightly against the end wall 12 when it is lowered to the position shown in Figure 3.

Figure 3:
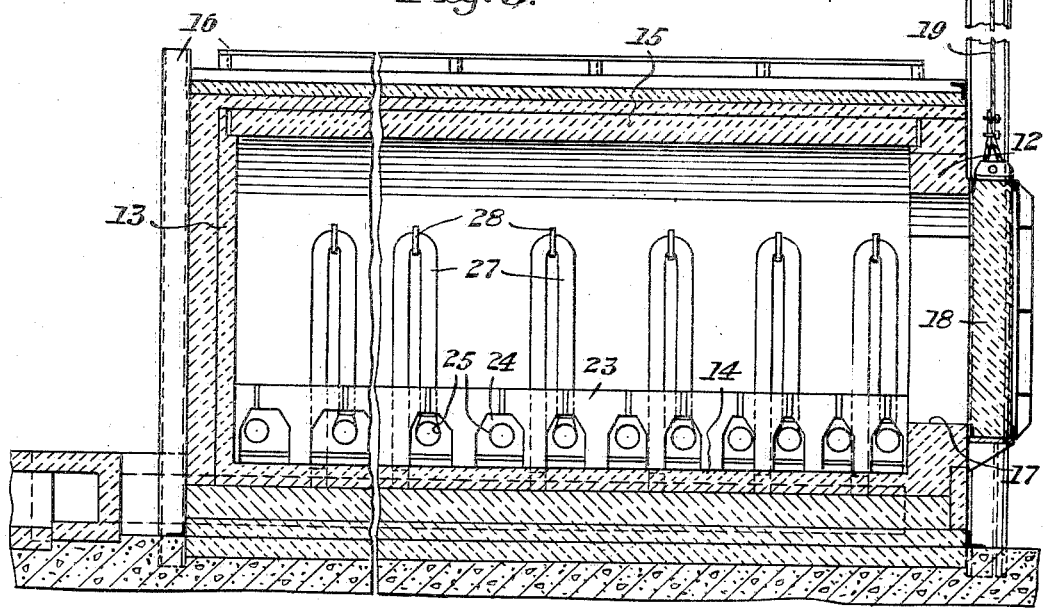
Figure 3 is a longitudinal vertical section taken along the line III—III of Figure 1.

The hearth 14 is provided with work supports in the form of castings 23, preferably composed of heat-resistant alloy. The castings have openings 24, spaced therealong, as shown in Figure 3.

Heat-exchange tubes 25 extending across the hearth 14 and upwardly along the side walls 10 and 11 are disposed in spaced relation longitudinally of the furnace. Each of the tubes 25 includes a horizontal portion 26 extending through holes in one of the side walls and the openings 24 in the work-supporting castings 23.

In addition to the horizontal tube section 26, each complete heat-exchange tube 25 has a hair-pin element 27, the curved portion whereof rests on a bracket 28, extending inwardly from one of the side walls. One end of each hair-pin element is connected to one of the horizontal tube sections 26 of an elbow 29. The other end of each hair-pin element extends downwardly through an opening in a sealing block 30, overlying an exhaust duct 31, of which there are two, one on each side of the hearth 14. Each block 30 is provided with a sealing channel 32, having sealing material, such as sand, disposed therein. The end of the hair-pin element 27 extending into the block is provided with a depending sealing flange 33, adapted to enter the channel 32.

Figure 2:
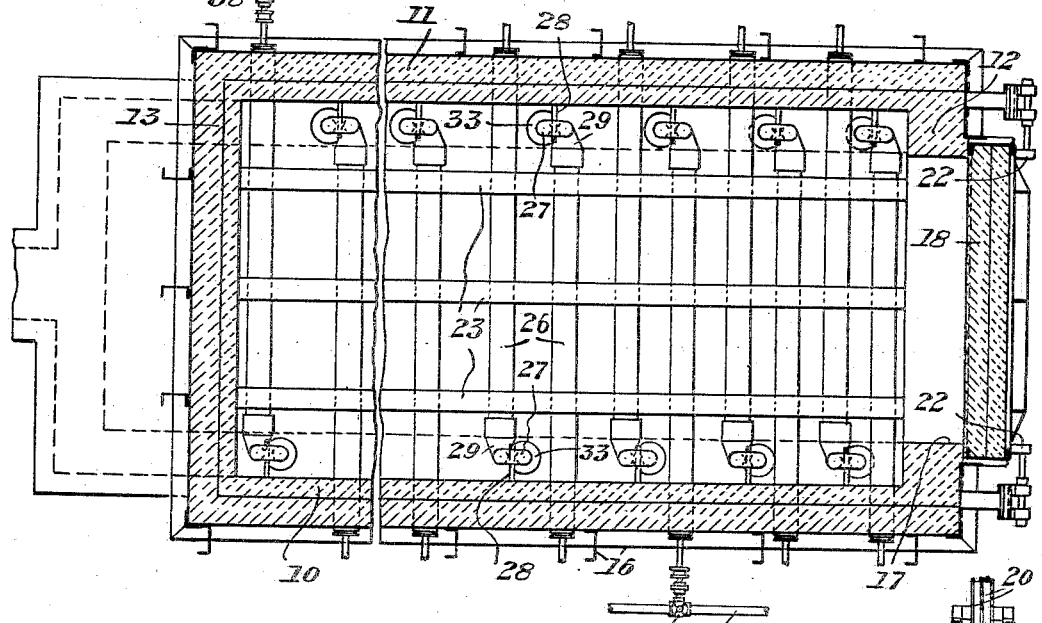
Figure 2 is a longitudinal horizontal sectional view taken along the line II—II of Figure 1.

As best shown in Figure 2, adjacent heat-exchange tubes 25 have their horizontal sections 26 extending inwardly through opposite side walls of the furnace. A burner 34 extends into the outer end of each tube section 26 and cooperates with a burner block 35 adjacent thereto. Fuel is supplied to the burners from headers 36, carried on brackets 37 extending outwardly from the frame 16. Manual control valves 38 permit the adjustment of the fuel supply for each burner.

Igniter electrodes 39 are mounted adjacent each burner and connected to transformers 40, whereby to create a spark gap adjacent the burner tip for initiating the combustion thereat.

The operation of the furnace just described will be apparent, but a brief explanation thereof will be given hereinbelow.

When the fuel has been admitted to the headers 36 by manipulation of a main control valve (not shown), the transformers 40 are energized to ignite the combustible mixture issuing from the burners. Combustion of this mixture takes place throughout the horizontal sections 26 of the heat-exchange tubes 25, heating the latter to radiant temperature. The hot combustion gases then flow upwardly through one leg of the hair-pin shaped vertical sections 27 of the heat-exchange tubes and downwardly through the other leg into one of the ducts 31. The total length of the tube sections is such that a high efficiency of heat transfer is attained. The vertical tube sections 27 are also heated to radiant temperature and radiate heat laterally onto the work, while the tube sections 26 radiate their heat upwardly. The arrangement of horizontal and vertical tube sections furthermore satisfies the preferred practice in the enameling art, viz., by supplying more heat from the sides of the enameling furnace than from the hearth.

The advantages of the structure described herein will be readily apparent. The high thermal efficiency has already been mentioned. The furnace is practically gastight at all points by virtue of the tightly fitting door 18 and the seals provided at the discharge ends of the heat-exchange tubes. This prevents loss of heat by radiation and also prevents discharge of combustion gases into the working space. The exhaust ducts 31 convey the waste combustion products to a stack so that the working floor around the furnace is not heated to an excessive temperature.

Although I have illustrated and described herein but a preferred embodiment of the invention, it will be understood that changes in the construction illustrated may be made without departing from the spirit of the invention or the scope of the appended claims.

I claim:

1. A furnace comprising a hearth, side and end walls and a roof, straight heat-exchange tubes extending across said hearth from opposite side walls, and hair-pin shaped heat-exchange tubes carried by said side walls, one end of each hair-pin tube communicating with one of said straight tubes, and the other communicating with an exhaust duct extending along said hearth.

2. The combination with a furnace chamber including spaced side walls, of transverse heat-exchange tubes extending into said chamber through said side walls, hair-pin shaped heat-exchange tubes carried on said side walls, and elbows connecting the inner ends of the transverse tubes to one end of the hair-pin tubes, the other ends of the hair-pin tubes connecting with exhaust ducts extending along said side walls.

3. In a furnace having spaced side walls defining a hearth therebetween, heat-exchange tubes spaced along said hearth and side walls, each of said tubes extending into the chamber from one side wall, across the hearth, upwardly of the opposite side walls and then downwardly thereof, the downwardly projecting ends of the tubes communicating with exhaust ducts extending along said side walls.

4. In a furnace having spaced side walls defining a hearth therebetween, heat-exchange tubes spaced along said hearth and side walls, each of said tubes extending into the chamber from one side wall, across the hearth, upwardly of the opposite side wall and then downwardly toward an exhaust duct extending along one of said side walls, the lower end of each tube entering a hole in a refractory block overlying said duct.

5. In a furnace having spaced side walls defining a hearth therebetween, heat-exchange tubes spaced along said hearth and side walls, each of said tubes extending into the chamber from one side wall, across the hearth, upwardly of the opposite side wall and then downwardly toward an exhaust duct extending along one of said side walls, the lower end of each tube entering a hole in a refractory block overlying said duct, and cooperating sealing means on said tube ends and said blocks.

6. A furnace including spaced walls and a hearth therebetween, transverse heat-exchange tubes extending across said hearth, brackets extending inwardly from said side walls, substantially vertical heat-exchange tubes bent back on themselves and suspended on said brackets, elbows connecting each of the transverse tubes to one end of one of the vertical tubes, the other end of each vertical tube communicating with an exhaust duct extending along one of said side walls.

JAMES C. WOODSON.